_(12)_ United States Patent
Hamada et al.

(10) Patent No.: US 9,656,734 B1
(45) Date of Patent: May 23, 2017

(54) OUTBOARD MOTOR

(71) Applicant: YAMAHA HATSUDOKI KABUSHIKI KAISHA, Iwata-shi, Shizuoka (JP)

(72) Inventors: Satoru Hamada, Shizuoka (JP); Kazuya Takeuchi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/337,243

(22) Filed: Oct. 28, 2016

(30) Foreign Application Priority Data

Nov. 12, 2015 (JP) ................................. 2015-222386

(51) Int. Cl.
*B63H 23/04* (2006.01)
*B63H 20/00* (2006.01)
*F01M 11/02* (2006.01)

(52) U.S. Cl.
CPC ........... *B63H 20/002* (2013.01); *B63H 23/04* (2013.01); *F01M 11/02* (2013.01); *F01M 2011/026* (2013.01)

(58) Field of Classification Search
CPC .......................... F16H 57/0428; B63H 20/002
See application file for complete search history.

(56) References Cited

U.S. PATENT DOCUMENTS

| 1,763,970 | A | * | 6/1930 | Johnson | B63H 20/32 123/196 W |
| 1,822,573 | A | * | 6/1930 | Anderson | B63H 20/002 123/196 W |
| 2008/0014804 | A1 | | 1/2008 | Asakaze | |
| 2008/0017451 | A1 | * | 1/2008 | Fukuoka | B63H 21/38 184/6.12 |
| 2013/0052891 | A1 | | 2/2013 | Yoshigasaki et al. | |

FOREIGN PATENT DOCUMENTS

| JP | 57-182595 A | 11/1982 |
| JP | 62-019499 U | 2/1987 |
| JP | 2008-18867 A | 1/2008 |

* cited by examiner

*Primary Examiner* — Edwin Swinehart
(74) *Attorney, Agent, or Firm* — Keating and Bennett, LLP

(57) ABSTRACT

In an outboard motor, a feed passage, through which a lubricating oil that flows upward from a gear mechanism due to rotation of the gear mechanism is fed upward from a gear chamber, includes a first feed passage, extending from the gear chamber to a connection passage via a first upstream passage, a spiral passage, and an interior of an upper bearing, in that order, and a second feed passage, extending from the first upstream passage to the connection passage while bypassing the spiral passage via a bypass passage. The bypass passage is positioned farther outward than the spiral passage in a radial direction of the driveshaft. A diameter of a cross section of the bypass passage that is orthogonal or substantially orthogonal to a center line of the driveshaft is smaller than a maximum diameter of the driveshaft.

13 Claims, 4 Drawing Sheets

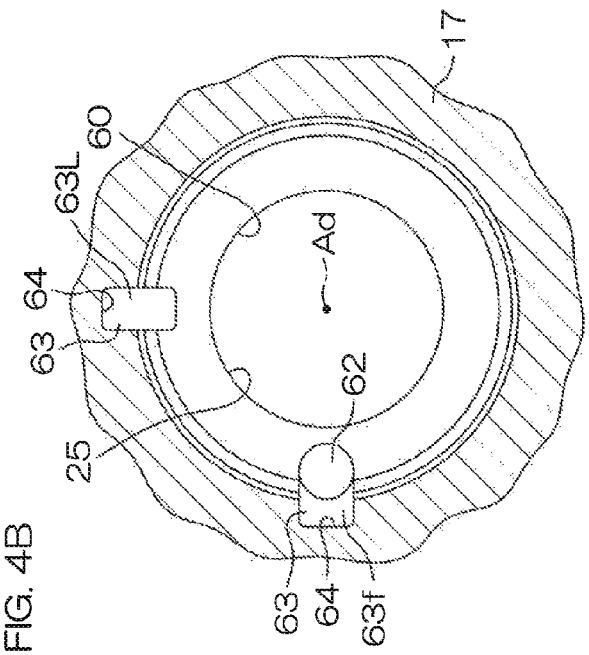
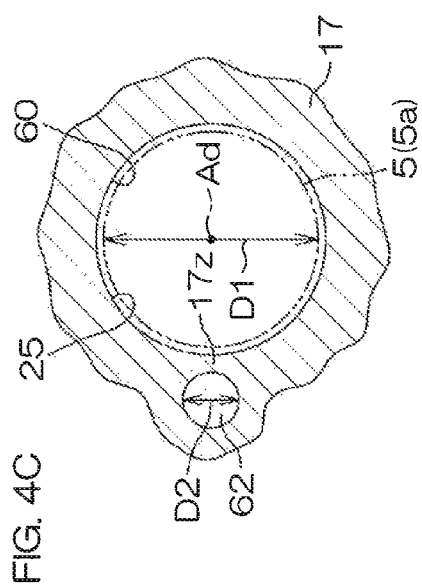
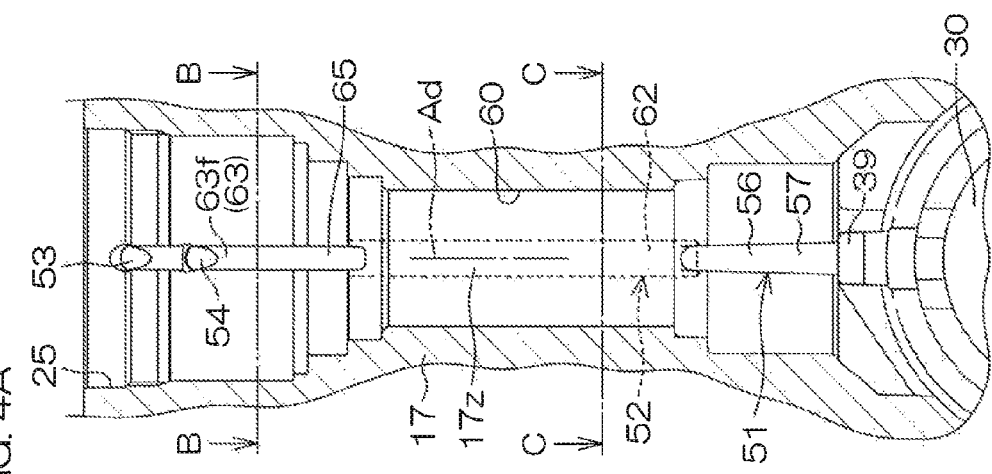

OUTBOARD MOTOR

BACKGROUND OF THE INVENTION

1. Field of the Invention

The present invention relates to an outboard motor.

2. Description of the Related Art

US2013/0052891A1 discloses an outboard motor including a gear case disposed underwater and a gear mechanism housed inside the gear case and lubricated by a lubricating oil. The lubricating oil is stored in a gear chamber provided in the gear case. The lubricating oil inside the gear chamber is thrown upward by rotation of a bevel gear included in the gear mechanism and fed upward to an oil slinger provided at a driveshaft. The lubricating oil suppled to the oil slinger is guided upward along a spiral oil groove by rotation of the driveshaft. The lubricating oil is thus supplied to an internal gap of a tapered roller bearing that rotatably supports the driveshaft. The lubricating oil that has passed upwardly through the tapered roller bearing is returned to the gear chamber by a main lubrication circulation portion and a sub lubrication circulation portion.

JP S57182595 A discloses an example of a conventional circulation path for a lubricating oil. As in US2013/0052891A1, the lubricating oil inside a gear chamber of JP S57182595 A is fed upward by rotations of a pinion, a forward drive gear, and a reverse drive gear. The lubricating oil is fed from the gear chamber to an insertion space via a lower communication passage extending upward from the gear chamber. A sleeve surrounding a driveshaft is disposed at the insertion space. The lubricating oil supplied to the insertion space enters inside the sleeve from an opening portion that opens at an outer peripheral surface of the sleeve and is fed upward by a spiral lead portion provided on an inner peripheral surface of the sleeve. The lubricating oil is supplied to an upper bearing via an oil feed portion extending upward from the lead portion. The lubricating oil supplied to the upper bearing flows downward between an inner peripheral surface of the insertion space and the outer peripheral surface of the sleeve and is discharged from the insertion space via an upper communication passage positioned at a height between the upper bearing and the lead portion. An outer diameter of a passage defined between the inner peripheral surface of the insertion space and the outer peripheral surface of the sleeve is greater than an outer diameter of the driveshaft.

With a conventional outboard motor, a lubricating oil is circulated in a circulation path provided in an interior of a lower case that is disposed underwater. Gears, bearings, etc., are thus lubricated and these members are cooled by the lubricating oil. The lubricating oil that has cooled the gears, etc., is cooled by the lower case, etc., while circulating through the circulation path. A temperature of the lubricating oil is thus maintained within an appropriate range. However, since a heat amount generated at the lower case increases as gears and other rotating bodies are made larger and outboard motors are made higher in output, a temperature increase of the lubricating oil must be minimized to prevent the temperature of the lubricating oil from exceeding the appropriate range.

A temperature increase of the lubricating oil is suppressed by increasing a total amount of the lubricating oil circulating inside the lower case because a heat capacity of the lubricating oil as a whole is thus increased. Also, a temperature increase of the lubricating oil is decreased without increasing the total amount of the lubricating oil by improving circulation efficiency of the lubricating oil, that is, by preventing stagnation of the lubricating oil or increasing a circulation flow rate of the lubricating oil because heat radiation from the lubricating oil will then be performed effectively.

However, with the method of increasing the total amount of the lubricating oil, an oil storage chamber storing the lubricating oil inside the lower case must be enlarged. Depending on the outboard motor, it may not be possible to provide a lower case with such a large oil storage chamber. Also, when the lower case is enlarged to enlarge the oil storage chamber, the outboard motor is lowered in propulsion efficiency because of increased resistance of water applied to the outboard motor.

With the outboard motor of US2013/0052891A1, two lubrication circulation portions (the main lubrication circulation portion and the sub lubrication circulation portion) that return the lubricating oil that has lubricated the tapered roller bearing to the gear chamber are provided to smoothly circulate the lubricating oil without enlarging the gear case. However, the circulation flow rate of the lubricating oil is dependent on a supply capacity of the oil slinger that feeds the lubricating oil to the tapered roller bearing and therefore the lubricating oil cannot be circulated at a flow rate exceeding the supply capacity of the oil slinger. That is, unless the lubricating oil supply capacity at the oil slinger is increased, the circulation flow rate of the circulation system as a whole cannot be increased even if the sub lubrication circulation portion is added.

A flow rate of the lubricating oil supplied to the oil slinger by rotation of the bevel gear and a flow rate of the lubricating oil fed by the oil slinger both increase with increase of engine speed. However, during high speed rotation, the flow rate of the lubricating oil supplied to the oil slinger by rotation of the bevel gear becomes greater than the flow rate of the lubricating oil fed by the oil slinger. Even when the flow rate of the lubricating oil supplied to the oil slinger exceeds the flow rate of the lubricating oil fed by the oil slinger, the lubricating oil will not be circulated at a flow rate exceeding the supply capacity of the oil slinger. Further, in this case, the lubricating oil stagnates between the bevel gear and the oil slinger, so that a pressure of the lubricating oil increases and the temperature of the lubricating oil increases.

Similarly with the outboard motor of JP S57182595 A, the lubricating oil cannot be circulated at a flow rate exceeding a supply capacity of the spiral lead portion.

SUMMARY OF THE INVENTION

In order to overcome the previously unrecognized and unsolved challenges described above, a preferred embodiment of the present invention provides an outboard motor including a prime mover, a driveshaft extending in an up/down direction below the prime mover and to which a rotation of the prime mover is transmitted, a gear mechanism coupled to a lower end portion of the driveshaft and to which a rotation of the driveshaft is transmitted, a propeller shaft to which a rotation of the gear mechanism is transmitted, a lower case defining a gear chamber housing the gear mechanism and a lubricating oil and in which the driveshaft is inserted, an upper bearing positioned above the gear mechanism and rotatably supporting the driveshaft inside the lower case, a feed passage through which the lubricating oil that is made to flow upward from the gear mechanism by rotation of the gear mechanism is fed upward from the gear chamber, a return passage separate from the feed passage and returning the lubricating oil, fed by the feed passage, to the gear chamber, and a connection passage guiding the lubricating oil from the feed passage to the return passage.

The feed passage includes a first feed passage, including a first upstream passage, extending upward from the gear chamber, and a spiral passage, spirally surrounding the driveshaft below the upper bearing, and extending from the gear chamber to the connection passage via the first upstream passage, the spiral passage, and an interior of the upper bearing in that order, and a second feed passage, including a bypass passage, separated from the spiral passage, and extending from the first upstream passage to the connection passage while bypassing the spiral passage by the bypass passage. The bypass passage is positioned farther outward than the spiral passage in a radial direction of the driveshaft. A diameter of a cross section of the bypass passage that is orthogonal or substantially orthogonal to a center line of the driveshaft is smaller than a maximum diameter of the driveshaft. The "diameter of a cross section of the bypass passage that is orthogonal or substantially orthogonal to a center line of the driveshaft" means a maximum value of a straight line joining two points on a contour line of the cross section of the bypass passage. The cross section of the bypass passage may be circular, elliptical, or polygonal or may have a C shape extending in a circumferential direction of the driveshaft.

With the present arrangement, when the prime mover rotates the driveshaft, the gear mechanism housed in the gear chamber of the lower case rotates and the lubricating oil inside the gear chamber is fed upward. The lubricating oil is thus made to flow through the first upstream passage, the spiral passage, and the interior of the upper bearing of the first feed passage, in that order. The second feed passage extends from the first upstream passage to the connection passage while bypassing the spiral passage by the bypass passage. A portion of the lubricating oil flowing upward from the gear mechanism flows through the bypass passage toward the connection passage without passing through the spiral passage.

The bypass passage bypassing the spiral passage is thus provided in the second feed passage and therefore a flow rate of the lubricating oil flowing through a circulation path including the gear chamber, the feed passage, the connection passage, and the return passage is not restricted by the spiral passage. The lubricating oil is thus circulated at a flow rate exceeding a supply capacity of the spiral passage. Circulation efficiency of the lubricating oil flowing through the circulation path is thus improved and the lubricating oil inside the lower case is cooled effectively.

A flow passage area of the bypass passage is preferably greater than a flow passage area of the spiral passage.

With the present arrangement, the flow passage area of the bypass passage bypassing the spiral passage is greater than the flow passage area of the spiral passage. The lubricating oil is thus guided through the bypass passage at a flow rate greater than a flow rate of the lubricating oil flowing through the spiral passage. The circulation efficiency of the lubricating oil is thus improved.

The feed passage preferably includes a merging portion disposed on an upstream side of the connection passage and connecting the first feed passage and the second feed passage to each other. The merging portion may connect the first feed passage and the second feed passage to each other either upstream or downstream the upper bearing.

With the present arrangement, the first feed passage and the second feed passage are connected to each other by the merging portion at a position upstream of the connection passage and therefore excess lubricating oil is released from one of either of the first feed passage and the second feed passage to the other of either of the first feed passage and the second feed passage. An increase in pressure of the lubricating oil at the first feed passage and the second feed passage is thus significantly reduced or prevented.

The merging portion preferably connects the first feed passage and the second feed passage to each other at a position that is upstream the upper bearing and downstream the spiral passage.

With the present arrangement, the lubricating oil that has bypassed the spiral passage is supplied from the second feed passage to the first feed passage at a position that is upstream the upper bearing and downstream the spiral passage. The lubricating oil supplied to the first feed passage at the merging portion is supplied to an internal gap of the upper bearing that is positioned downstream the merging portion. A flow rate of the lubricating oil supplied to the upper bearing is thus increased. Further, the excess lubricating oil is released from the first feed passage to the second feed passage via the merging portion, so that the pressure of the lubricating oil is prevented from increasing at a portion between the upper bearing and the spiral passage.

The second feed passage preferably further includes at least one outer peripheral passage that bypasses the interior of the upper bearing. Preferably, a flow passage area of the at least one outer peripheral passage is greater than the internal gap of the upper bearing. Specifically, if the at least one outer peripheral passage is a plurality of outer peripheral passages, a sum of flow passage areas of the plurality of outer peripheral passages is preferably greater than the internal gap of the upper bearing. If the at least one outer peripheral passage is a single outer peripheral passage, the flow passage area of the outer peripheral passage is preferably greater than the internal gap of the upper bearing.

With the present arrangement, the second feed passage extends toward the connection passage while bypassing the internal gap of the upper bearing by the outer peripheral passage. By bypassing the internal gap of the upper bearing that is small in flow passage area, a flow rate of the lubricating oil flowing through the second feed passage is prevented from being restricted by the internal gap of the upper bearing. The circulation efficiency of the lubricating oil is thus improved and the lubricating oil is cooled effectively.

A portion of the outer peripheral passage is preferably defined by an outer peripheral surface of the upper bearing.

With the present arrangement, an inner wall surface of the outer peripheral passage that defines the outer peripheral passage includes the outer peripheral surface of the upper bearing, and the outer peripheral surface of the upper bearing defines a portion of the outer peripheral passage. The lubricating oil inside the outer peripheral passage flows while being in contact with the outer peripheral surface of the upper bearing. The upper bearing is thus cooled by the lubricating oil flowing through the outer peripheral passage. The upper bearing is thus cooled while improving the circulation efficiency of the lubricating oil.

The at least one outer peripheral passage preferably includes a plurality of outer peripheral passages spaced apart in the circumferential direction of the driveshaft.

With the present arrangement, the second feed passage is provided with the plurality of outer peripheral passages that bypass the interior of the upper bearing. A flow passage area of the second feed passage is thus increased and the circulation efficiency of the lubricating oil is thus improved further.

The connection passage preferably includes a first connection passage and a second connection passage that differ from each other. The first connection passage guides the lubricating oil from the first feed passage to the return passage and the second connection passage guides the lubricating oil from the second feed passage to the return passage.

With the present arrangement, the lubricating oil inside the first feed passage is guided to the return passage by the first connection passage and the lubricating oil inside the second feed passage is guided to the return passage by the second connection passage. The first connection passage and the second connection passage are separate passages that do not intersect each other. A flow passage area of the connection passage is thus increased and the flow rate of the lubricating oil flowing through the circulation path is prevented from being restricted by the connection passage.

The first feed passage is preferably connected to just the first connection passage and the second feed passage may be connected to just the second connection passage. Or, the second feed passage may be connected to both the first connection passage and the second connection passage.

When the second feed passage is connected to both the first connection passage and the second connection passage, the second feed passage includes a portion intersecting the first connection passage and a portion intersecting the second connection passage. When the amount of lubricating oil flowing through the second feed passage is high, a portion of the lubricating oil flows from the second feed passage to the second connection passage and the remaining lubricating oil flows from the second feed passage to the first connection passage. A portion of the lubricating oil flowing through the second feed passage is thus released to the first connection passage and the circulation flow rate of the lubricating oil is thus prevented from being restricted by the second connection passage.

The spiral passage preferably includes a spiral groove extending in the up/down direction while spirally surrounding the center line of the driveshaft. At least a portion of the bypass passage is preferably positioned at a height between an upper end and a lower end of the spiral groove. For example, both an upper end and a lower end of the bypass passage may be positioned at heights between the upper end and the lower end of the spiral groove. The spiral groove may be provided at an outer peripheral surface of the driveshaft or may be provided on a circular or substantially circular cylindrical surface surrounding the driveshaft. The circular cylindrical surface may be a portion of the lower case or may be a portion of a member separate from the lower case.

The bypass passage is preferably integral and unitary with the lower case.

The connection passage preferably includes an upstream end connected to the feed passage and a downstream end connected to the return passage. At least one of either of the upstream end and the downstream end of the connection passage may be positioned above an oil surface of the lubricating oil when the prime mover is stopped.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4A is a view of a vertical section, including a center line of a driveshaft and orthogonal or substantially orthogonal to a center line of a propeller shaft, as viewed from the rear.

FIG. 4B is a horizontal section taken along line B-B in FIG. 4A.

FIG. 4C is a horizontal section taken along line C-C in FIG. 4A.

DETAILED DESCRIPTION OF THE PREFERRED EMBODIMENTS

An outboard motor 2 in a reference orientation shall be described below. The reference orientation is an orientation where a rotational axis of a propeller shaft 7 extends horizontally in a front/rear direction.

Figure 1:
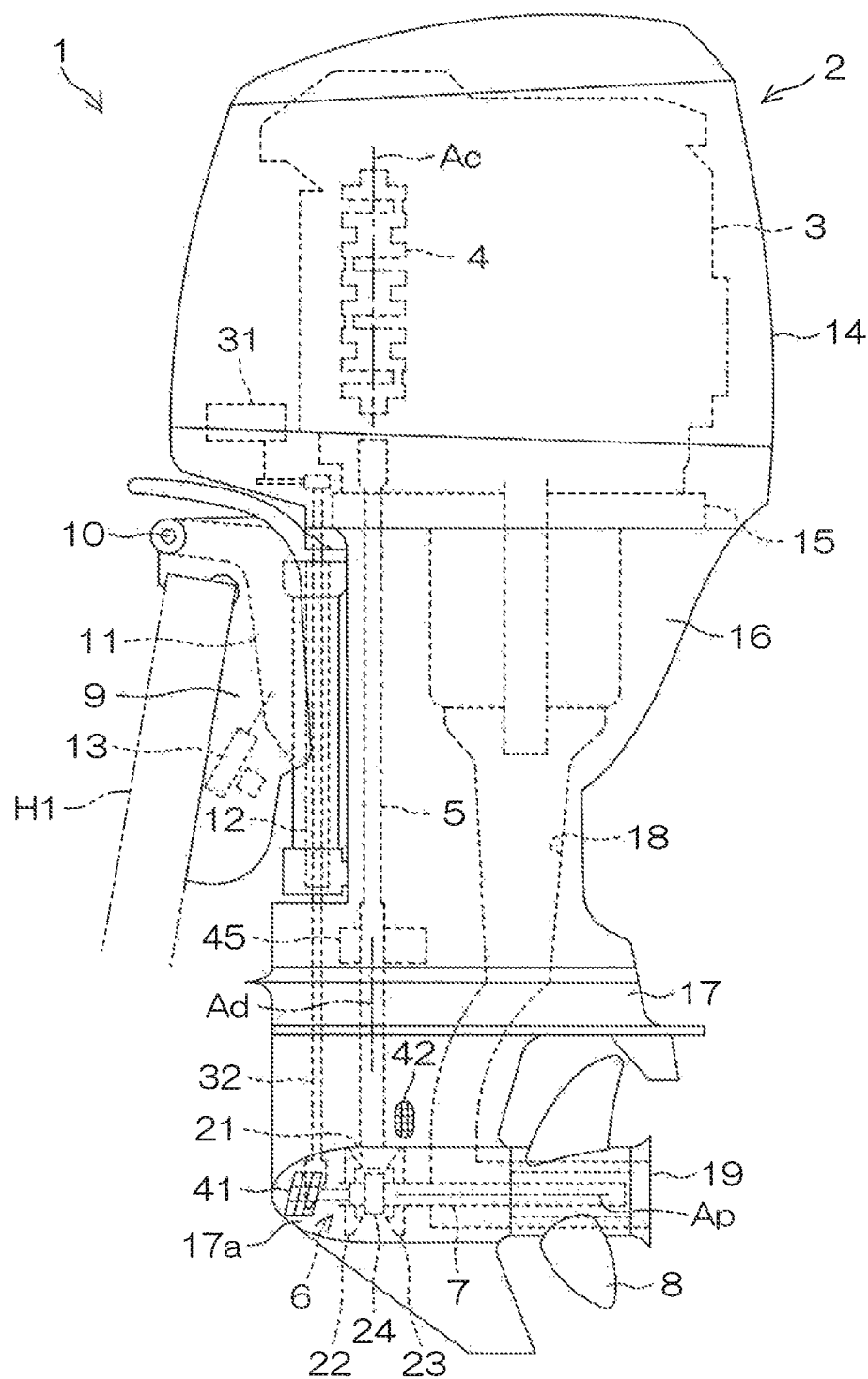
FIG. 1 is a schematic view of a left side of an outboard motor according to a preferred embodiment of the present invention.
Figure 2:
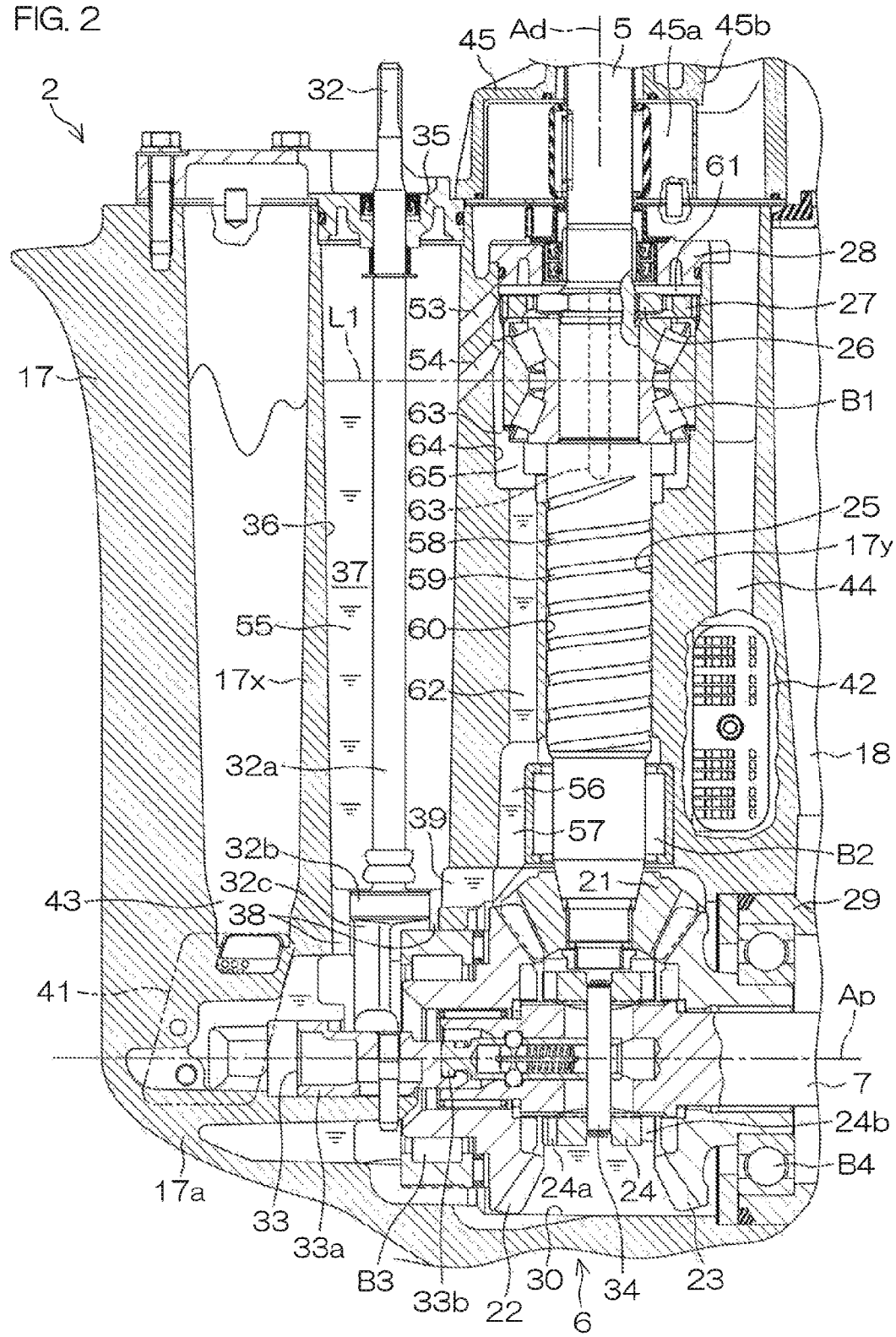
FIG. 2 is a vertical sectional view showing an interior of a lower case provided in the outboard motor.

FIG. 1 is a schematic view of a left side of an outboard motor 2 according to a preferred embodiment of the present invention. FIG. 2 is a vertical sectional view showing an interior of a lower case 17 provided in the outboard motor 2. FIGS. 1 and 2 show a state in which the outboard motor 2 is in the reference orientation.

As shown in FIG. 1, a vessel propulsion device 1 includes the outboard motor 2 that generates a thrust that propels a vessel and a suspension system mounting the outboard motor 2 to a hull H1.

The outboard motor 2 includes a prime mover 3 that generates motive power to rotate a propeller 8, and a power transmission apparatus that transmits the motive power of the prime mover 3 to the propeller 8. Rotation of the prime mover 3 is transmitted to the propeller 8 via a driveshaft 5, a gear mechanism 6, and a propeller shaft 7 of the power transmission apparatus. The propeller 8 is thus made to rotate together with the propeller shaft 7 to generate a thrust that propels a vessel forward or rearward.

The suspension system includes a pair of clamp brackets 9, fixed to a transom provided at a rear portion of the hull H1, and a tilting shaft 10, supported by the pair of clamp brackets 9 in an orientation of extending horizontally in the right/left direction. The suspension system further includes a swivel bracket 11, supported by the pair of clamp brackets 9 via the tilting shaft 10, and a steering shaft 12, supported by the swivel bracket 11 in an orientation of extending vertically in an up/down direction.

The outboard motor 2 is coupled to an upper end portion and a lower end portion of the steering shaft 12. The steering shaft 12 is rotatable with respect to the swivel bracket 11 around a center line of the steering shaft 12 that extends in the up/down direction. The swivel bracket 11 is rotatable with respect to the clamp brackets 9 around a center line of the tilting shaft 10 that extends in the right/left direction. The outboard motor 2 is rotatable in the right/left direction with respect to the hull H1 and is rotatable in the up/down direction with respect to the hull H1.

The vessel propulsion device 1 includes a steering mechanism pivoting the outboard motor 2 around the steering shaft 12 with respect to the clamp brackets 9, and a power trim and tilt mechanism (hereinafter referred to as "PTT") pivoting the outboard motor 2 around the tilting shaft 10 with respect to the clamp brackets 9. A hydraulic cylinder 13 of the PTT is disposed between the pair of clamp brackets 9. The PTT positions the outboard motor 2 at any position from a tilt-down position (position shown in FIG. 1) at which the propeller 8 is positioned underwater to a tilt-up position at which the propeller 8 is positioned above a water surface.

The outboard motor 2 includes a cowling 14 that accommodates the prime mover 3 and a casing that accommodates the power transmission apparatus. The casing includes an exhaust guide 15 disposed below the prime mover 3, an upper case 16 disposed below the exhaust guide 15, and a lower case 17 disposed below the upper case 16. The lower case 17 includes a circular or substantially circular cylindrical torpedo portion 17a extending in the front/rear direction. The torpedo portion 17a is a portion that is disposed underwater. The torpedo portion 17a includes a closed front end, a rearwardly open rear end, and a tapered outer surface that narrows as the front end is approached.

The driveshaft 5 extends in the up/down direction inside the exhaust guide 15, the upper case 16, and the lower case 17. The gear mechanism 6 is coupled to a lower end portion of the driveshaft 5. The propeller shaft 7 extends in the front/rear direction inside the torpedo portion 17a. The gear mechanism 6 is coupled to a front end portion of the propeller shaft 7. The propeller 8 is removably mounted to a rear end portion of the propeller shaft 7 that projects rearward from a rear end of the torpedo portion 17a. The driveshaft 5 is rotatable with respect to the casing around a center line (drive axis Ad) of the driveshaft 5. The propeller shaft 7 is rotatable with respect to the casing around a center line (propeller axis Ap) of the propeller shaft 7.

The prime mover 3 is an engine (internal combustion engine). The prime mover 3 may be an electric motor or may include both an engine and an electric motor. A rear end portion of the propeller 8 defines an exhaust port 19 that discharges exhaust gas underwater. The exhaust gas generated at the prime mover 3 is discharged underwater from the exhaust port 19 via an exhaust passage 18 provided in an interior of the outboard motor 2. The prime mover 3 is disposed on the exhaust guide 15 defining a prime mover supporting member in an orientation where the rotational axis Ac of the crankshaft 4 is vertical or substantially vertical. A direction of the rotation transmitted from the driveshaft 5 to the propeller shaft 7 is switched by the gear mechanism 6. The propeller 8 rotates in the same direction as the propeller shaft 7. A direction of rotation of the propeller 8 is thus switched between a forward rotation direction and a reverse rotation direction. A direction of the thrust is thus switched.

As shown in FIG. 2, the gear mechanism 6 includes a cylindrical or substantially cylindrical pinion 21 that rotates around the drive axis Ad together with the driveshaft 5, a cylindrical or substantially cylindrical front gear 22 and rear gear 23 engaged with the pinion 21, and a cylindrical or substantially cylindrical dog clutch 24 that selectively engages with one of either of the front gear 22 and the rear gear 23. The outboard motor 2 includes a shift mechanism that moves the dog clutch 24 in an axial direction (front/rear direction) of the propeller shaft 7 to switch a shift state of the gear mechanism 6.

The pinion 21 is coupled to a lower end portion of the driveshaft 5. The driveshaft 5 is inserted in a shaft insertion hole 25 provided in the lower case 17. The driveshaft 5 is rotatably supported by the lower case 17 via an upper bearing B1 and a lower bearing B2 that surround the driveshaft 5. The pinion 21 is disposed below the lower bearing B2, and the upper bearing B1 is disposed above the lower bearing B2.

Each of the upper bearing B1 and the lower bearing B2 may be any of a ball bearing, a roller bearing, and a needle bearing, for example. FIG. 2 shows an example where the upper bearing B1 is a double-row tapered roller bearing and the lower bearing B2 is a needle bearing. The upper bearing B1 includes an inner ring surrounding the driveshaft 5, an outer ring surrounding the inner ring, and a plurality of rollers interposed between the inner ring and the outer ring. The lower bearing B2 includes an outer ring surrounding the driveshaft 5 and a plurality of needles interposed between the outer ring and the driveshaft 5.

The inner ring of the upper bearing B1 is sandwiched in an axial direction of the driveshaft 5 by an annular nut 26 mounted to the driveshaft 5 and an annular step portion provided at the driveshaft 5. The outer ring of the upper bearing B1 is sandwiched in the axial direction of the driveshaft 5 by an annular fixing ring 27 mounted to an inner peripheral surface of the shaft insertion hole 25 and an annular step portion provided at the shaft insertion hole 25. The fixing ring 27 surrounds a nut 26 across an interval in a radial direction of the driveshaft 5. The nut 26 and the fixing ring 27 are positioned between the upper bearing B1 and a shaft cap 28. An upper end of the shaft insertion hole 25 is closed by the cylindrical shaft cap 28 that surrounds the driveshaft 5.

The front gear 22 is disposed farther to the front than the drive axis Ad. The rear gear 23 is disposed farther to the rear than the drive axis Ad. The dog clutch 24 is disposed between the front gear 22 and the rear gear 23. A front end portion of the propeller shaft 7 is inserted inside the cylindrical front gear 22, rear gear 23, and dog clutch 24. The front gear 22 and the rear gear 23 are supported by the lower case 17 so as to be rotatable around the propeller axis Ap. When the prime mover 3 rotates the driveshaft 5, the rotation of the pinion 21 defining a drive gear is transmitted to the front gear 22 and the rear gear 23 defining driven gears and the front gear 22 and the rear gear 23 rotate in mutually opposite directions.

The front gear 22 is rotatably supported by the lower case 17 via a front bearing B3 that surrounds the front gear 22. The rear gear 23 is rotatably supported by the lower case 17 via a rear bearing B4 that surrounds the rear gear 23. The front bearing B3 is inserted inside the torpedo portion 17a, and the rear bearing B4 is inserted inside a cylindrical or substantially cylindrical bearing housing 29 surrounding the propeller shaft 7. The rear bearing B4 is supported by the lower case 17 via the bearing housing 29.

The dog clutch 24 is splined to the propeller shaft 7. The dog clutch 24 is movable in an axial direction of the propeller shaft 7 with respect to the propeller shaft 7 and rotates integrally with the propeller shaft 7 around the propeller axis Ap. The dog clutch 24 includes a front engaging portion 24a facing an engaging portion of the front gear 22 and a rear engaging portion 24b facing an engaging portion of the rear gear 23. The dog clutch 24 is movable along the propeller shaft 7 in the front/rear direction between a forward rotation position at which the front engaging portion 24a engages with the engaging portion of the front gear 22 and a reverse rotation position at which the rear engaging portion 24b engages with the engaging portion of the rear gear 23. A position between the forward rotation position and the reverse rotation position is a neutral position (position shown in FIG. 2) at which the dog clutch 24 is not engaged with either of the front gear 22 and the rear gear 23.

The pinion 21, the front gear 22, the rear gear 23, and the dog clutch 24 are disposed inside a gear chamber 30 provided in the torpedo portion 17a. The gear chamber 30 is defined by an inner surface of the torpedo portion 17a. The gear chamber 30 is filled with a lubricating oil (gear oil) that lubricates the gear mechanism 6. The shaft insertion hole 25 is disposed above the gear chamber 30. The shaft insertion hole 25 is connected to the gear chamber 30 via a lower bearing bypass groove 57 provided around the lower bearing B2. The lubricating oil is movable between the gear chamber 30 and the shaft insertion hole 25 via the lower bearing bypass groove 57.

The shift mechanism positions the dog clutch 24 at one shift position among the forward rotation position, the reverse rotation position, and the neutral position. The shift mechanism includes a shift actuator 31 (see FIG. 1) driven in accordance with a shift operation by a user and a shift rod 32 that is driven to rotate by the shift actuator 31. The shift mechanism further includes a slide shaft 33 driven in the front/rear direction by the shift rod 32 and a coupling pin 34 coupling the slide shaft 33 and the dog clutch 24.

The shift rod 32 includes a rod portion 32a extending in the up/down direction, a disk portion 32b disposed below the rod portion 32a, and a crank portion 32c disposed below the disk portion 32b. The rod portion 32a and the disk portion 32b are coaxial and a portion (eccentric portion) of the crank portion 32c is eccentric with respect to the rod portion 32a and the disk portion 32b. An outer diameter of the disk portion 32b is greater than an outer diameter of the rod portion 32a.

The rod portion 32a is positioned in front of the driveshaft 5 and is parallel or substantially parallel to the driveshaft 5. The rod portion 32a is inserted in a rod insertion hole 36 provided at the lower case 17. The rod insertion hole 36 extends in the up/down direction along the rod portion 32a. An inner peripheral surface of the rod insertion hole 36 surrounds the rod portion 32a across an interval in a radial direction of the shift rod 32. The rod portion 32a projects upward from an upper end of the rod insertion hole 36. The upper end of the rod insertion hole 36 is closed by an annular rod cap 35 that surrounds the rod portion 32a. A lower end of the rod insertion hole 36 is closed by the disk portion 32b. The rod portion 32a is supported by the lower case 17 via the rod cap 35 so as to be rotatable around a center line of the rod portion 32a.

The inner peripheral surface of the rod insertion hole 36, the rod cap 35, and the disk portion 32b define a shift chamber 37 that houses the rod portion 32a. The shift chamber 37 is positioned above the gear chamber 30. The shift chamber 37 is connected to the gear chamber 30 via a plurality of rod bypass grooves 38 disposed around the disk portion 32b. The shift chamber 37 is also connected to the gear chamber 30 via a penetrating hole 39 penetrating through a portion of the lower case 17, positioned between the shift rod 32 and the pinion 21, in the front/rear direction. The penetrating hole 39 is positioned between the shift rod 32 and the pinion 21. The lubricating oil is movable between the gear chamber 30 and the shift chamber 37 via the rod bypass grooves 38 or the penetrating hole 39.

The lubricating oil that lubricates the gears, bearings, etc., is stored not only in the gear chamber 30 but also in the shaft insertion hole 25 and the shift chamber 37. The gear chamber 30, the shaft insertion hole 25, and the shift chamber 37 define an oil storage chamber storing the lubricating oil. When the prime mover 3 is stopped and idle, an oil surface (oil level L1) of the lubricating oil is positioned between an upper end of the upper bearing B1 and a lower end of the upper bearing B1. That is, the entire gear chamber 30 is filled with the lubricating oil and portions of the shaft insertion hole 25 and the shift chamber 37 are filled with the lubricating oil. A position (height) of the oil surface of the lubricating oil changes in accordance with a temperature of the lubricating oil.

The slide shaft 33 includes a front shaft 33a mounted to the crank portion 32c and a rear shaft 33b mounted to the coupling pin 34. The rear shaft 33b is inserted inside the propeller shaft 7 from the front of the propeller shaft 7, and the front shaft 33a extends forward from the rear shaft 33b. The front shaft 33a projects forward from a front end of the propeller shaft 7. The crank portion 32c is mounted to the front shaft 33a at the front of the propeller shaft 7.

When the user operates a shift lever provided at a vessel operator compartment, the shift actuator 31 (see FIG. 1) causes the shift rod 32 to pivot around the center line of the rod portion 32a. A portion of the crank portion 32c is eccentric with respect to the rod portion 32a and therefore when the shift rod 32 pivots, a portion of the crank portion 32c moves in the front/rear direction. The front shaft 33a is thus pushed forward or rearward by the crank portion 32c and moves in the front/rear direction. Accordingly, the rear shaft 33b, the coupling pin 34, and the dog clutch 24 move integrally in the front/rear direction. The dog clutch 24 is thus disposed at one of the forward rotation position, the reverse rotation position, and the neutral position.

The outboard motor 2 includes a water cooling apparatus that cools respective portions of the outboard motor 2 including the prime mover 3. The water cooling apparatus includes a first water inlet 41 and a second water inlet 42 opening at an outer surface of the outboard motor 2, a cooling water passage guiding the water outside the outboard motor 2 that flowed into the first water inlet 41 and the second water inlet 42 to the respective portions of the outboard motor 2, and a water pump 45 generating a suction force that suctions the water outside the outboard motor 2 into the first water inlet 41 and the second water inlet 42.

The water pump 45 that is driven by the prime mover 3 is disposed on the cooling water passage provided in an interior of the outboard motor 2. The cooling water passage includes a first water supply passage 43 and a second water supply passage 44, which guide the water outside the outboard motor 2 to the respective portions of the outboard motor 2, and a drain passage by which the water that has cooled the respective portions of the outboard motor 2 is discharged to outside the outboard motor 2. The first water supply passage 43 extends to the water pump 45 from the first water inlet 41, disposed farther to the front than the driveshaft 5, and the second water supply passage 44 extends to the water pump 45 from the second water inlet 42, disposed farther to the rear than the driveshaft 5.

The water pump 45 includes an impeller 45a rotating together with the driveshaft 5 and a pump case 45b that accommodates the impeller 45a. When the prime mover 3 rotates the driveshaft 5, the impeller 45a rotates with respect to the pump case 45b. The pump case 45b is connected to the first water inlet 41 and the second water inlet 42 via the first water supply passage 43 and the second water supply passage 44 provided at the lower case 17. When the prime mover 3 rotates the driveshaft 5, the water outside the outboard motor 2 is suctioned as cooling water from the first water inlet 41 and the second water inlet 42 and via the first water supply passage 43 and the second water supply passage 44 into an interior of the pump case 45b and fed to the prime mover 3, etc., from the pump case 45. The respective portions of the outboard motor 2 are thus cooled.

The oil storage chamber that includes gear chamber 30, the shaft insertion hole 25, and the shift chamber 37 is provided at the lower case 17 that is disposed underwater.

The lower case 17 is preferably made of a metal that is higher in thermal conductivity than a resin. The lubricating oil inside the oil storage chamber is thus cooled by the water outside the outboard motor 2. Further, just a first partition wall 17x of the lower case 17 is interposed between the first water supply passage 43 and the shift chamber 37 and just a second partition wall 17y of the lower case 17 is interposed between the second water supply passage 44 and the shaft insertion hole 25. The lubricating oil inside the shift chamber 37 and the shaft insertion hole 25 are thus cooled effectively by the cooling water flowing through the first water supply passage 43 and the second water supply passage 44.

An oil circulation system circulating the lubricating oil inside the outboard motor 2 shall now be described.

Figure 3:
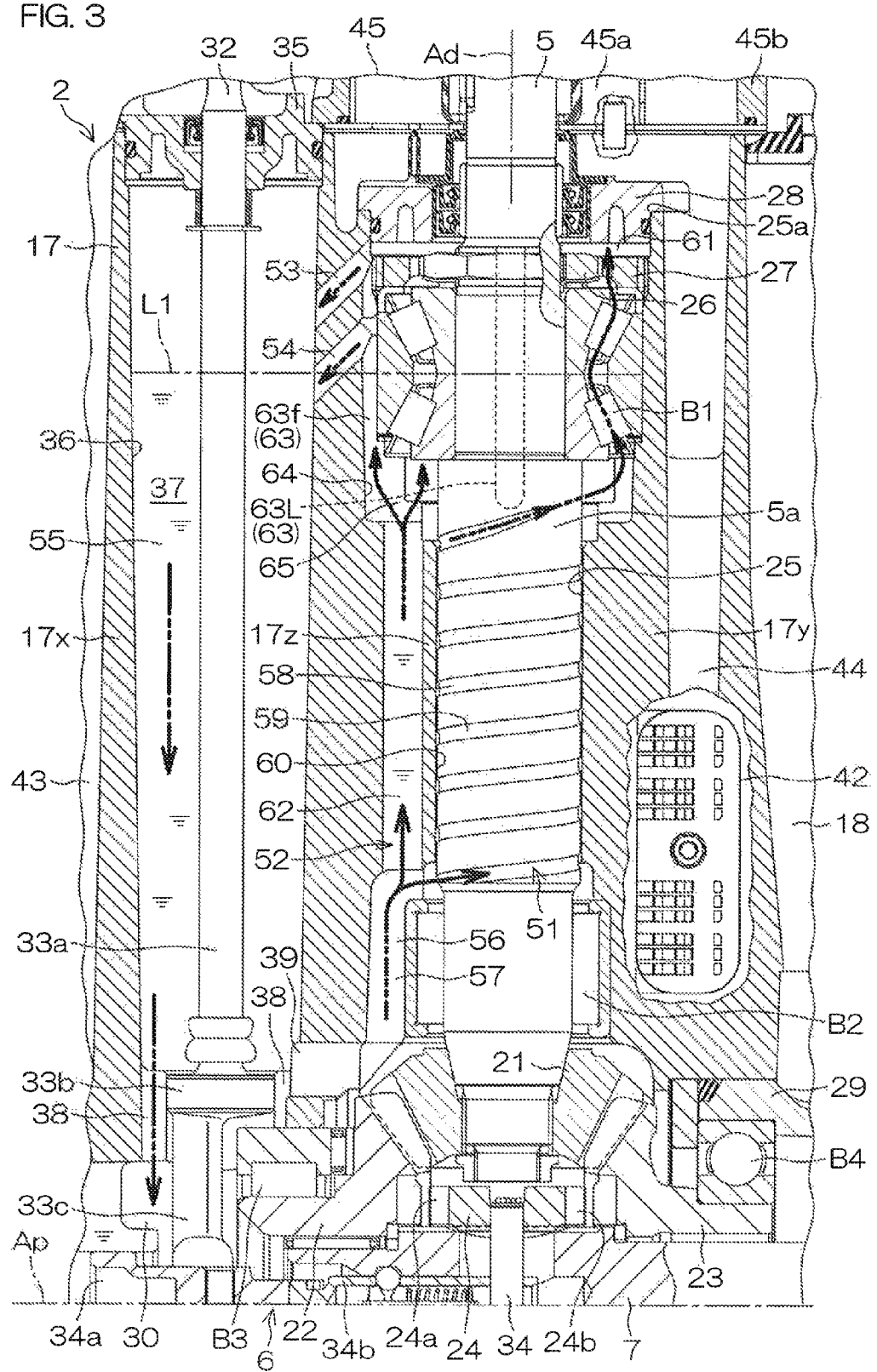
FIG. 3 is a partially enlarged view of FIG. 2.

FIG. 3 is partially enlarged view of FIG. 2. FIG. 4A is a view of a vertical section, including the drive axis Ad and orthogonal or substantially orthogonal to the propeller axis Ap, as viewed from the rear. FIG. 4B is a horizontal section taken along line B-B in FIG. 4A, and FIG. 4C is a horizontal section taken along line C-C in FIG. 4A.

As shown in FIG. 3, the oil circulation system includes a feed passage 51, 52 feeding the lubricating oil upward from the gear chamber 30, a return passage 55 returning the lubricating oil, fed by the feed passage, to the gear chamber 30, and a connection passage 53, 54 guiding the lubricating oil from the feed passage to the return passage 55.

The feed passage includes a first feed passage 51 and a second feed passage 52 that are separated from each other between the upper bearing B1 and the lower bearing B2. The return passage 55 is defined by the shift chamber 37 and the plurality of rod bypass grooves 38. The connection passage includes one or more passages extending from the feed passage to the return passage 55. FIG. 3 shows an example where the connection passage is provided with a first connection passage 53 and a second connection passage 54.

The gear chamber 30, the feed passage, the connection passage, and the return passage 55 define a circulation path through which the lubricating oil inside the lower case 17 is circulated. When the prime mover 3 rotates the driveshaft 5, the lubricating oil inside the gear chamber 30 is fed upward by rotation of the gear mechanism 6 and the lubricating oil is fed upward by a screw pump defined by a spiral groove 59 and a pump defining surface 60. The lubricating oil inside the gear chamber 30 is thus made to pass through the feed passage, the connection passage, and the return passage 55 in that order and return to the gear chamber 30. In this process, the lubricating oil is cooled by the lower case 17, etc.

The first feed passage 51 includes a first upstream passage 56 extending upward from the gear chamber 30, a spiral first intermediate passage 58 provided around the driveshaft 5, an internal gap of the upper bearing B1, and a first downstream passage 61 provided between the upper bearing B1 and the shaft cap 28. The internal gap of the upper bearing B1 is, for example, a gap between the inner ring and the outer ring of the upper bearing B1. The first intermediate passage 58 is an example of a spiral passage.

The second feed passage 52 includes a second upstream passage extending upward from the gear chamber 30, a second intermediate passage 62 separated from the first intermediate passage 58 by a portion of the lower case 17, and one or more second downstream passages 63 extending upward from the second intermediate passage 62 while bypassing an interior of the upper bearing B1. FIG. 3 shows an example where two downstream passages 63 are provided and the second upstream passage is the same passage as the first upstream passage 56. The second intermediate passage 62 is an example of a bypass passage, and each second downstream passage 63 is an example of an outer peripheral passage.

The first upstream passage 56 is, for example, positioned in front of the lower bearing B2. An upstream end of the first upstream passage 56 that corresponds to a lower end is positioned lower than the lower bearing B2 and faces an engaging portion of the pinion 21 and the front gear 22 in the up/down direction. A downstream end of the first upstream passage 56 that corresponds to an upper end is positioned above the lower bearing B2 and faces an outer peripheral surface of the driveshaft 5 in a radial direction. As long as it extends upward from the gear chamber 30, the first upstream passage 56 may be vertical or may be inclined.

The first upstream passage 56 is defined by an inner surface of the lower bearing bypass groove 57 provided at the lower case 17 and an outer peripheral surface of the lower bearing B2. The lower bearing bypass groove 57 extends in the up/down direction along the outer peripheral surface of the lower bearing B2. The lower bearing bypass groove 57 is recessed outward from a circular or substantially circular cylindrical surface in contact with an outer peripheral surface of the outer ring of the lower bearing B2. A flow passage area of the first upstream passage 56 is greater than a flow passage area of the first intermediate passage 58.

The first intermediate passage 58 extends in the up/down direction along the driveshaft 5 while spirally surrounding the driveshaft 5. The first intermediate passage 58 is defined by the spiral groove 59 provided on an outer peripheral surface of a groove defining portion 5a of the driveshaft 5 and the circular cylindrical pump defining surface 60, which is a portion of the inner peripheral surface of the shaft insertion hole 25. The spiral groove 59 and the pump defining surface 60 define the screw pump that feeds the lubricating oil upward in accompaniment with the rotation of the driveshaft 5. A rotation direction of the spiral groove 59 is set so that the lubricating oil is fed upward in accompaniment with the rotation of the driveshaft 5. If the rotation direction of the driveshaft 5 is, for example, clockwise as viewed from above, the spiral groove 59 extends clockwise as viewed from above.

The spiral groove 59 extends in the up/down direction while spirally surrounding the center line of the driveshaft 5. An upper end of the spiral groove 59 corresponds to a downstream end of the first intermediate passage 58 and a lower end of the spiral groove 59 corresponds to an upstream end of the first intermediate passage 58. The upper end and the lower end of the spiral groove 59 are positioned at heights between the lower end of the upper bearing B1 and the upper end of the lower bearing B2. The lower end of the spiral groove 59 is positioned at the same height as the downstream end of the first upstream passage 56.

The first downstream passage 61 extends upward from the upper bearing B1. The first downstream passage 61 is in communication with the internal gap of the upper bearing B1. The first downstream passage 61 guides the lubricating oil, which has passed upward through the internal gap of the upper bearing B1, toward the first connection passage 53. The first downstream passage 61 is positioned between the upper bearing B1 and the shaft cap 28. The first downstream passage 61 passes between an outer peripheral surface of the nut 26 and an inner peripheral surface of the fixing ring 27 and extends from the upper bearing B1 to the shaft cap 28.

The second intermediate passage 62 extends upward from the first upstream passage 56. The second intermediate passage 62 is positioned below the upper bearing B1. The second intermediate passage 62 is positioned in front of the driveshaft 5. The second intermediate passage 62 is positioned between the shaft insertion hole 25 and the shaft chamber 37. The second intermediate passage 62 is a passage that is defined by the lower case 17 and is integral and unitary with the lower case 17.

The second intermediate passage 62 is a separate passage from the first intermediate passage 58 and does not intersect the first intermediate passage 58. A flow passage area of the second intermediate passage 62 is greater than the flow passage area of the first intermediate passage 58. In a radial direction of the driveshaft 5, the second intermediate passage 62 is positioned farther outward than the first intermediate passage 58. The second intermediate passage 62 is separated from the first intermediate passage 58 by a partition wall 17z of the lower case 17. The partition wall 17z is positioned between the first intermediate passage 58 and the second intermediate passage 62 in the radial direction of the driveshaft 5.

An upper end of the second intermediate passage 62 corresponds to a downstream end of the second intermediate passage 62, and a lower end of the second intermediate passage 62 corresponds to an upstream end of the second intermediate passage 62. Both the upper end and the lower end of the second intermediate passage 62 are positioned at heights between the upper end and the lower end of the spiral groove 59. The second intermediate passage 62 may be vertical from its upper end to its lower end or may be inclined obliquely with respect to a vertical direction. Also, the second intermediate passage 62 may have a broken line shape or a curved shape. A length of the second intermediate passage 62 in the up/down direction is shorter than a distance in the up/down direction from the lower end of the upper bearing B1 to the upper end of the lower bearing B2 and is longer than an outer diameter of the upper bearing B1.

As shown in FIG. 4A, the second intermediate passage 62 is longer than the first upstream passage 56 and the second downstream passages 63 in the up/down direction. As shown in FIG. 4B and FIG. 4C, the second intermediate passage 62 preferably is provided only in an annular region surrounding the pump defining surface 60. The second intermediate passage 62 preferably has, for example, a horizontal cross section of circular shape. As shown in FIG. 4C, an inner diameter of the second intermediate passage 62, that is, a diameter D2 of a cross section of the second intermediate passage 62 orthogonal or substantially orthogonal to the center line of the driveshaft 5 is less than an outer diameter D1 of the groove defining portion 5a, which is a maximum value of outer diameter of the driveshaft 5.

As shown in FIG. 3, each second downstream passage 63 extends in the up/down direction along an outer peripheral surface of the upper bearing B1. Each second downstream passage 63 is longer than the upper bearing B1 in the up/down direction. The plurality of second downstream passages 63 include a front downstream passage 63f positioned in front of the upper bearing B1 and a lateral downstream passage 63L positioned on the lateral of the upper bearing B1. The plurality of second downstream passages 63 are disposed across an interval in a circumferential direction of the driveshaft 5. The second downstream passages 63 are defined by an inner surface of an upper bearing bypass groove 64 provided at the lower case 17 and the outer peripheral surface of the upper bearing B1.

Upper ends of the second downstream passages 63 that correspond to downstream ends are positioned at heights between the upper end of the upper bearing B1 and a lower end of the rod cap 35. The upper ends of the second downstream passages 63 are positioned around the fixing ring 27. Lower ends of the second downstream passages 63 that correspond to upstream ends are positioned at heights between the upper end of the second intermediate passage 62 and the lower end of the upper bearing B1. The second downstream passages 63 are connected to the first feed passage 51 via a merging portion 65 positioned at a height between the upper end of the second intermediate passage 62 and the lower end of the upper bearing B1. The merging portion 65 faces the outer peripheral surface of the driveshaft 5 across an interval in a radial direction.

The first connection passage 53 and the second connection passage 54 are separate passages that do not intersect each other. The first connection passage 53 and the second connection passage 54 are parallel or substantially parallel to each other and extend obliquely downward from the shaft insertion hole 25 to the shift chamber 37. The first connection passage 53 and the second connection passage 54 are positioned at heights between an upper end 25a of the shaft insertion hole 25 and the lower end of the upper bearing B1. The first connection passage 53 is positioned above the second connection passage 54. The second connection passage 54 is positioned lower than the nut 26 and the fixing ring 27. The first connection passage 53 and the second connection passage 54 are mutually overlapped in plan view.

An upstream end of the first connection passage 53 opens at the inner peripheral surface of the shaft insertion hole 25. An upstream end of the second connection passage 54 opens at an inner peripheral surface of the upper bearing bypass groove 64. Downstream ends of both the first connection passage 53 and the second connection passage 54 open at an inner surface of the shift chamber 37. When the prime mover 3 is stopped, both the upstream end and the downstream end of the first connection passage 53 are disposed higher than the oil surface (oil level L1) of the lubricating oil. A length of the first connection passage 53, that is, a length of a center line of the first connection passage 53 is shorter than the outer diameter of the upper bearing B1 and longer than an inner diameter of the first connection passage 53. The same applies to the second connection passage 54.

An upper portion of the upstream end of the first connection passage 53 is positioned higher than the fixing ring 27 and is disposed at the same height as the first downstream passage 61. A lower portion of the upstream end of the first connection passage 53 is positioned around the fixing ring 27 and is disposed at the same height as the upper ends of the second downstream passages 63. The upstream end of the second connection passage 54 is positioned around the upper bearing B1 and faces the outer peripheral surface of the upper bearing B1 across an interval in a radial direction. The second connection passage 54 is directly connected to the second downstream passage 63. The first connection passage 53 is directly connected to each of the first downstream passage 61 and the second downstream passage 63. The second connection passage 54 is indirectly connected to the first downstream passage 61 and the first connection passage 53 via the second downstream passage 63.

A flow of the lubricating oil inside the lower case 17 shall now be described with reference to FIG. 3.

When the prime mover 3 (see FIG. 1) rotates the driveshaft 5, the pinion 21, the front gear 22, and rear gear 23 rotate around their respective center lines and the spiral groove 59 provided at the groove defining portion 5a of the driveshaft 5a rotates around the drive axis Ad. At the same time, the water pump 45 rotates and the water outside the outboard motor 2 is supplied as cooling water to the water pump 45 via the first water supply passage 43 and the second water supply passage 44.

The gear chamber 30, in which the pinion 21, the front gear 22, and the rear gear 23 are housed, is filled with the lubricating oil. When the front gear 22 rotates, the lubricating oil inside the gear chamber 30 flows upward from the front gear 22 and is supplied to the first upstream passage 56 shared by the first feed passage 51 and the second feed passage 52. A portion of the lubricating oil supplied to the first upstream passage 56 is fed upward along the first intermediate passage 58 by the screw pump defined by the spiral groove 59 and the pump defining surface 60. The remaining lubricating oil supplied to the first upstream passage 56 is guided upward by the second intermediate passage 62.

The lubricating oil guided upward by the first intermediate passage 58 is supplied to the internal gap of the upper bearing B1. A portion of the lubricating oil guided upward by the second intermediate passage 62 is supplied to the first feed passage 51 via the merging portion 65 and the remaining lubricating oil is supplied to the front downstream passage 63f positioned in front of the upper bearing B1. A portion of the lubricating oil supplied to the first feed passage 51 via the merging portion 65 is supplied to the internal gap of the upper bearing B1 and the remaining lubricating oil is supplied to the lateral downstream passage 63L positioned on the lateral side of the upper bearing B1.

The lubricating oil guided by the front downstream passage 63f is supplied to the second connection passage 54 disposed below the first connection passage 53. Also, the lubricating oil guided by the lateral downstream passage 63L is supplied to the first downstream passage 61 positioned above the upper bearing B1. The lubricating oil discharged upward from the internal gap of the upper bearing B1 is also supplied to the first downstream passage 61. The lubricating oil supplied to the first downstream passage 61 is supplied to the first connection passage 53.

The first downstream passage 61 is connected not just to the first connection passage 53 but also to the second connection passage 54 via the front downstream passage 63f. When a pressure of the lubricating oil at the first downstream passage 61 is higher than a pressure of the lubricating oil at the front downstream passage 63f, a portion of the lubricating oil inside the first downstream passage 61 flows into the first connection passage 53 and the remaining lubricating oil is supplied to the second connection passage 54 after flowing in reverse through the front downstream passage 63f. Oppositely, when the pressure of the lubricating oil at the first downstream passage 61 is lower than the pressure of the lubricating oil at the front downstream passage 63f, a portion of the lubricating oil inside the front downstream passage 63f flows into the second connection passage 54 and the remaining lubricating oil is supplied to the first connection passage 53.

The lubricating oil supplied to the first connection passage 53 and the second connection passage 54 is guided from the shaft insertion hole 25 of the feed passage to the rod insertion hole 36 of the return passage 55. The lubricating oil supplied inside the rod insertion hole 36 flows downward inside the rod insertion hole 36 due to gravity while being cooled by the lower case 17. The lubricating oil that has reached a vicinity of the disk portion 32b of the shift rod 32 flows into the gear chamber 30 via the rod bypass groove 38. The lubricating oil is thus returned to the gear chamber 30 by the return passage 55. The lubricating oil that has returned to the gear chamber 30 is fed upward again by the rotation of the gear mechanism 6.

As described above, with the present preferred embodiment, when the prime mover 3 rotates the driveshaft 5, the gear mechanism 6 housed in the gear chamber 30 of the lower case 17 rotates and the lubricating oil inside the gear chamber 30 is fed upward. The lubricating oil is thus made to flow through the first upstream passage 56, the first intermediate passage 58, and the upper bearing B1 interior of the first feed passage 51, in that order. The second feed passage 52 extends from the first upstream passage 56 to the connection passage while bypassing the first intermediate passage 58 by the second intermediate passage 62. A portion of the lubricating oil flowing upward from the gear mechanism 6 flows through the second intermediate passage 62 toward the connection passage without passing through the first intermediate passage 58.

The second intermediate passage 62 bypassing the spiral first intermediate passage 58 is thus provided in the second feed passage 52 and therefore a flow rate of the lubricating oil flowing through the circulation path including the gear chamber 30, the feed passage, the connection passage, and the return passage 55 is not restricted by the first intermediate passage 58. The lubricating oil is thus circulated at a flow rate exceeding a supply capacity of the first intermediate passage 58. Circulation efficiency of the lubricating oil flowing through the circulation path is thus improved and the lubricating oil inside the lower case 17 is cooled effectively.

Further, the lubricating oil is released to the second intermediate passage 62, so that the lubricating oil is prevented from increasing in pressure at the first upstream passage 56, even if a flow rate of the lubricating oil flowing upward from the gear mechanism 6 increases. Further, the second intermediate passage 62 is provided not farther inward than the spiral first intermediate passage 58 but is provided outward of the spiral first intermediate passage 58, so that complicating of the structure of the passage is prevented. Moreover, the diameter D2 of the cross section of the second intermediate passage 62 is smaller than the maximum diameter D1 of the driveshaft 5, so that an increase in size of the lower case 17 is prevented.

With the present preferred embodiment, the flow passage area of the second intermediate passage 62 bypassing the spiral first intermediate passage 58 is greater than the flow passage area of the first intermediate passage 58. The lubricating oil is thus guided through the second intermediate passage 62 at a flow rate greater than a flow rate of the lubricating oil flowing through the first intermediate passage 58. The circulation efficiency of the lubricating oil is thus improved.

With the present preferred embodiment, the first feed passage 51 and the second feed passage 52 are connected to each other by the merging portion 65 at a position upstream of the connection passage and therefore excess lubricating oil is released from one of either of the first feed passage 51 and the second feed passage 52 to the other of either of the first feed passage 51 and the second feed passage 52. Pressure increase of the lubricating oil at the first feed passage 51 and the second feed passage 52 is thus significantly reduced or prevented.

With the present preferred embodiment, the lubricating oil that has bypassed the spiral first intermediate passage 58 is supplied from the second feed passage 52 to the first feed passage 51 at a position that is upstream the upper bearing B1 and downstream the first intermediate passage 58. The lubricating oil supplied to the first feed passage 51 at the merging portion 65 is supplied to the internal gap of the upper bearing B1 that is positioned downstream the merging portion 65. The flow rate of the lubricating oil supplied to the upper bearing B1 is thus increased. Further, the excess lubricating oil is released from the first feed passage 51 to the second feed passage 52 via the merging portion 65, so that the pressure of the lubricating oil is prevented from increasing at a portion between the upper bearing B1 and the first intermediate passage 58.

With the present preferred embodiment, the second feed passage 52 extends toward the connection passage while bypassing the internal gap of the upper bearing B1 by the plurality of second downstream passages 63. By bypassing the internal gap of the upper bearing B1 that is small in flow passage area, the flow rate of the lubricating oil flowing through the second feed passage 52 is prevented from being restricted by the internal gap of the upper bearing B1. Further, the second feed passage 52 is provided with the plurality of second downstream passages 63, so that a sufficient flow passage area is secured for the passage bypassing the upper bearing B1.

With the present preferred embodiment, an inner wall surface of each second downstream passage 63 that defines each second downstream passage 63 includes the outer peripheral surface of the upper bearing B1, and the outer peripheral surface of the upper bearing B1 defines portions of the outer peripheral passage. The lubricating oil inside each second downstream passage 63 flows while in contact with the outer peripheral surface of the upper bearing B1. The upper bearing B1 is thus cooled by the lubricating oil flowing through each second downstream passage 63. The upper bearing B1 is thus cooled while improving the circulation efficiency of the lubricating oil.

With the present preferred embodiment, the lubricating oil inside the first feed passage 51 is guided to the return passage 55 by the first connection passage 53 and the lubricating oil inside the second feed passage 52 is guided to the return passage 55 by the second connection passage 54. The first connection passage 53 and the second connection passage 54 are separate passages that do not intersect each other. A flow passage area of the connection passage is thus increased and the flow rate of the lubricating oil flowing through the circulation path is prevented from being restricted by the connection passage.

With the present preferred embodiment, the second feed passage 52 is connected not just to the second connection passage 54 but also to the first connection passage 53. The second feed passage 52 includes a portion intersecting the first connection passage 53 and a portion intersecting the second connection passage 54. When the amount of lubricating oil flowing through the second feed passage 52 is high, a portion of the lubricating oil flows from the second feed passage 52 to the second connection passage 54 and the remaining lubricating oil flows from the second feed passage 52 to the first connection passage 53. A portion of the lubricating oil flowing through the second feed passage 52 is thus released to the first connection passage 53 and the circulation flow rate of the lubricating oil is thus prevented from being restricted by the second connection passage 54.

OTHER PREFERRED EMBODIMENTS

The present invention is not restricted to the contents of the preferred embodiments and various modifications are possible within the scope of the present invention.

For example, with the preferred embodiment described above, a non-limiting example where the first upstream passage 56 is preferably shared by the first feed passage 51 and the second feed passage 52 was described. However, the second feed passage 52 may include a second upstream passage separate from the first upstream passage 56.

With the preferred embodiment described above, a non-limiting example where the first upstream passage 56 is adjacent to the lower bearing B2 and the second downstream passages 63 preferably are adjacent to the upper bearing B1 was described. However, the first upstream passage 56 may be separated from the lower bearing B2. Similarly, the second downstream passages 63 may be separated from the upper bearing B1.

With the preferred embodiment described above, a non-limiting example where the second intermediate passage 62 preferably is integral with the lower case 17 was described. However, the second intermediate passage 62 may be defined by a member separate from the lower case 17.

With the preferred embodiment described above, a non-limiting example where the second intermediate passage 62 preferably is positioned in front of the driveshaft 5 was described. However, the second intermediate passage 62 may be positioned to a side or behind the driveshaft 5. The same applies to the first upstream passage 56.

With the preferred embodiment described above, a non-limiting example where both the upper end and the lower end of the second intermediate passage 62 preferably are positioned at heights between the upper end and the lower end of the spiral groove 59 was described. However, a portion of the second intermediate passage 62 may be disposed higher than or lower than the spiral groove 59.

A non-limiting example case where the cross section of the second intermediate passage 62 is circular or substantially circular was described. However, the cross section of the second intermediate passage 62 does not have to be circular. For example, the cross section of the second intermediate passage 62 may be elliptical or polygonal or may be a C shape extending along the shaft insertion hole 25.

With the preferred embodiment described above, a non-limiting example where the lower ends of the second downstream passages 63 that correspond to the upstream ends preferably are connected by the merging portion 65 to the first feed passage 51 was described. However, a partition wall separating the lower ends of the second downstream passages 63 from the first feed passage 51 may be provided in place of the merging portion 65.

With the preferred embodiment described above, a non-limiting example where the second connection passage 54 preferably is positioned higher than the lower end of the upper bearing B1 was described. However, at least a portion of the second connection passage 54 may be positioned lower than the lower end of the upper bearing B1. In this case, the second downstream passages 63 may be omitted. That is, the second connection passage 54 may extend from the second intermediate passage 62 to the return passage 55.

Also, features of two or more of the various preferred embodiments described above may be combined.

The present application corresponds to Japanese Patent Application No. 2015-222386 filed on Nov. 12, 2015 in the Japan Patent Office, and the entire disclosure of this application is incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
   a prime mover;
   a driveshaft extending in an up/down direction below the prime mover and to which a rotation of the prime mover is transmitted;
   a gear mechanism coupled to a lower end portion of the driveshaft and to which a rotation of the driveshaft is transmitted;
   a propeller shaft to which a rotation of the gear mechanism is transmitted;
   a lower case in which the driveshaft is inserted and defining a gear chamber that houses the gear mechanism and a lubricating oil;
   an upper bearing positioned above the gear mechanism and rotatably supporting the driveshaft inside the lower case;
   a feed passage through which the lubricating oil that is made to flow upward from the gear mechanism by rotation of the gear mechanism is fed upward from the gear chamber;
   a return passage separate from the feed passage and returning the lubricating oil, fed by the feed passage, to the gear chamber; and
   a connection passage guiding the lubricating oil from the feed passage to the return passage; wherein
   the feed passage includes:
      a first feed passage including a first upstream passage extending upward from the gear chamber and a spiral passage spirally surrounding the driveshaft below the upper bearing, the first feed passage extending from the gear chamber to the connection passage via the first upstream passage, the spiral passage, and an interior of the upper bearing in that order; and
      a second feed passage including a bypass passage separated from the spiral passage, the second feed passage extending from the first upstream passage to the connection passage and bypassing the spiral passage by the bypass passage;
      the bypass passage is positioned farther outward than the spiral passage in a radial direction of the driveshaft; and
      a diameter of a cross section of the bypass passage that is orthogonal or substantially orthogonal to a center line of the driveshaft is smaller than a maximum diameter of the driveshaft.

2. The outboard motor according to claim 1, wherein a flow passage area of the bypass passage is greater than a flow passage area of the spiral passage.

3. The outboard motor according to claim 1, wherein the feed passage includes a merging portion disposed on an upstream side of the connection passage and connecting the first feed passage and the second feed passage to each other.

4. The outboard motor according to claim 3, wherein the merging portion connects the first feed passage and the second feed passage to each other at a position that is upstream of the upper bearing and downstream of the spiral passage.

5. The outboard motor according to claim 1, wherein the second feed passage includes at least one outer peripheral passage that bypasses the interior of the upper bearing.

6. The outboard motor according to claim 5, wherein a portion of the at least one outer peripheral passage is defined by an outer peripheral surface of the upper bearing.

7. The outboard motor according to claim 5, wherein the at least one outer peripheral passage includes a plurality of outer peripheral passages spaced apart in a circumferential direction of the driveshaft.

8. The outboard motor according to claim 1, wherein
   the connection passage includes a first connection passage and a second connection passage that differ from each other;
   the first connection passage guides the lubricating oil from the first feed passage to the return passage; and
   the second connection passage guides the lubricating oil from the second feed passage to the return passage.

9. The outboard motor according to claim 8, wherein the second feed passage is connected to both the first connection passage and the second connection passage.

10. The outboard motor according to claim 1, wherein
    the spiral passage includes a spiral groove extending in the up/down direction and spirally surrounds the center line of the driveshaft; and
    at least a portion of the bypass passage is positioned at a height between an upper end and a lower end of the spiral groove.

11. The outboard motor according to claim 10, wherein both an upper end and a lower end of the bypass passage are positioned at heights between the upper end and the lower end of the spiral groove.

12. The outboard motor according to claim 1, wherein the bypass passage is integral and unitary with the lower case.

13. The outboard motor according to claim 1, wherein
    the connection passage includes an upstream end connected to the feed passage and a downstream end connected to the return passage; and
    at least one of either of the upstream end and the downstream end of the connection passage is positioned above an oil surface of the lubricating oil when the prime mover is stopped.

* * * * *